United States Patent Office 3,655,695
Patented Apr. 11, 1972

3,655,695
6-ALKYL-SUBSTITUTED TETRAHYDROPYRAN-2-OLS AND PROCESS FOR THEIR PRODUCTION
David Andrews, 24 Hillside Ave., Nutley, N.J. 07110, and Gabriel Saucy, 125 Fells Road, Essex Fells, N.J. 07021
No Drawing. Continuation-in-part of application Ser. No. 633,693, Apr. 26, 1967. This application May 21, 1969, Ser. No. 826,669
Int. Cl. C07d *13/04*
U.S. Cl. 260—340.5                    24 Claims

ABSTRACT OF THE DISCLOSURE 6-substituted -tetrahydropyran-2-ols are prepared by reaction of Grignard reagents with lower alkyl-glutaraldehyde or glutaraldehyde. The products are useful intermediates in the total synthesis of steroids.

BACKGROUND OF THE INVENTION 6-substituted-tetrahydropyran-2-ols are valuable chemicals. They are especially valuable as intermediates in the total synthesis of steroids. Total synthesis utilizing these compounds as intermediates are described in U.S. patent applications of Gabriel Saucy: Ser. No. 549,816, filed May 13, 1966; Ser. No. 604,124, filed Dec. 23, 1966 and Ser. No. 633,730, filed Apr. 26, 1967 all now abandoned. The present invention provides a facile route for the preparation of 6-substituted-tetrahydropyran-2-ols and novel products.

RELATED APPLICATIONS

This application is a continuation-in-part of Ser. No. 633,693, filed Apr. 26, 1967 now abandoned.

DETAILED DESCRIPTION OF THE INVENTION

This invention is concerned with tetrahydropyran-2-ols which are substituted in the 6-position, and to a process for their production. More particularly, this invention relates to 6-alkyl-tetrahydropyran-2-ols and 6-(4-substituted pentyl)tetrahydropyran-2-ols and to a method for their preparation.

The 6-substituted-tetrahydropyran-2-ols with which this invention is concerned are represented by the formula:

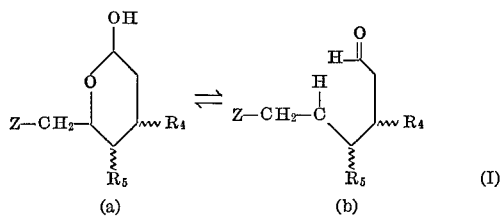

(I)

wherein Z is 3-oxobutyl [$CH_3CO(CH_2)_{2-}$] or R; R is hydrogen, lower alkyl, or a 3-substituted butyl radical of the formula $R_6CH_2C(R_1,R_2)CH(R_7)CH(R_8)$—; $R_1$, when taken alone, is $OR_3$; $R_2$, when taken alone, is hydrogen; $R_1$ and $R_2$, when taken together, are lower alkylenedioxy, arylenedioxy, the monothia, monoaza or dithia chalocogen thereof; $R_3$ is hydrogen, lower alkyl or a lower oxyhydrocarbyl group; and each of $R_4$, $R_5$, $R_6$, $R_7$ and $R_8$ is independently hydrogen or lower alkyl.

It should be noted that compounds of Formula I are believed to exist in solution in two tautomeric forms as indicated above by Sub-formulae I(a) and I(b) respectively. The cyclic structure of Formula I(a) is believed to be the lower energy form and is thus favored in the tautomeric equilibrium under most conditions. However, evidence for the existence of Formula I(b) is observed in the infrared wherein carbonyl stretching absorption peaks are observed. It is to be understood, however, that the absolute structure of compounds of Formula I is not critical to the context of the present invention. For purpose of convenience, compounds of Formula I will be named as derivatives of the closed compounds of form (a), i.e., as tetrahydropyranols, it being understood that such name will denote the equilibrium mixture of the two forms. Furthermore, all further reference to tetrahydropyranol derivatives of other formulae herein will be meant to include the equilibrium mixture including the corresponding acyclic form.

By the term "lower alkyl" is meant straight and branched chain alkyl groups of from 1 to 7 carbons, inclusive, such as methyl, ethyl, propyl, isopropyl, butyl, isobutyl, sec.-butyl, tert.-butyl, pentyl, hexyl and the like. Lower alkyl groups designated by R are preferably n-alkyl groups, with methyl being especially preferred. Lower alkyl groups designated by $R_3$ are preferably tert.-alkyl groups, with tert.-butyl being especially preferred. The moieties $R_4$, $R_5$, $R_6$, $R_7$ and $R_8$ are preferably hydrogen or when one or more of them is lower alkyl, methyl is preferred.

By the term "lower alkylenedioxy" is meant an alkylenedioxy group containing up to about 6 carbons, inclusive. Preferred alkylene dioxy groups are those which, when taken with the 3-carbon of the butyl radical, form the 1,3-dioxolane ring system, with ethylenedioxy being especially preferred, and those which form the 1,3-dioxane ring system, with 2,2-dimethyl-1,3-propylenedioxy being especially preferred.

By the term "arylenedioxy" is meant a mono or bicyclic aryl group having two oxy functions on adjacent carbon atoms in one aryl ring and which aryl ring(s) may bear additional substituents selected from the lower alkyl or lower alkoxy substituent groups. Examples of arylenedioxy groups include phenylenedioxy, 1,2-naphthylenedioxy, 2,3-naphthylenedioxy, among others.

The phraseology "lower alkylenedioxy, arylenedioxy, the monothia, monoaza or dithia chalcogen thereof" is used to indicate a ketalized oxo or thio moiety and comprehends moieties of the formulas —$OR_9O$—, —$OR_9S$—, —$OR_9N$— or —$SR_9S$— wherein $R_9$ is lower alkylene or arylene. Exemplary moieties are 1,2-ethylenedioxy, 2,2-dimethyl-1,3-propylenedioxy, 1,2-propylenedioxy, 2,3-butylenedioxy, phenylenedioxy, 1,2 - naphthylenedioxy, 2,3-naphthylenedioxy, 1,2-ethylenedimercapto or the like.

By the term "lower oxyhydrocarbyl" is meant a monovalent, saturated cyclic or acyclic group consisting of carbon, hydrogen, and oxygen containing up to about 10 carbons, inclusive, and only one oxygen, the latter being present solely in the form of an ether linkage. Illustrative oxyhydrocarbyl groups include methoxymethyl, ethoxymethyl, 1-methoxyethyl, 1-ethoxyethyl, 1-ethoxypropyl, tetrahydropyran-2-yl, and the like, with tetrahydropyran-2-yl being especially preferred.

The tetrahydropyranols of Formula I can be further classified according to the nature of the 6-substituent as follows:

(1) The 6-alkyltetrahydropyran-2-ols of the formula:

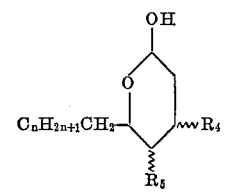

(II)

wherein n is an integer having a value of from 0 to 6, inclusive, and $R_4$ and $R_5$ are as defined above.

Illustrative examples include 6-methyltetrahydropyran-2-ol,
6-ethyltetrahydropyran-2-ol,
6-propyltetrahydropyran-2-ol,
6-butyl tetrahydropyran-2-ol,
6-pentyltetrahydropyran-2-ol
and the like;

(2 The 6 - (4-substituted pentyl)tetrahydropyran-2-ols of the formula:

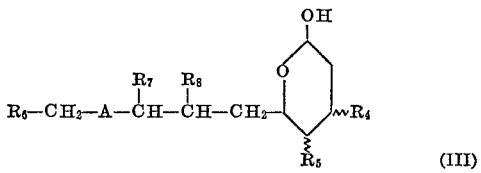

(III)

wherein A is carbonyl or —$CH_1R_2$— and $R_1$, $R_2$, $R_4$, $R_5$, $R_6$, $R_7$ and $R_8$ are as defined above.

Illustrative examples of these 6 - (4-substituted)tetrahydropyran-2-ols include:

(a) 6-(4-oxopentyl)tetrahydropyran-2-ols, as represented by the formula:

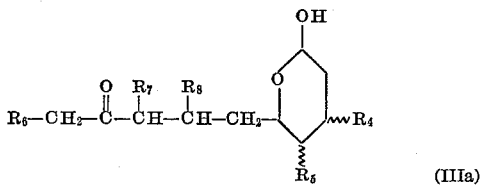

(IIIa)

wherein $R_4$, $R_5$, $R_6$, $R_7$ and $R_8$ have the same meaning as above. An illustrative example is 6-(4-oxopentyl)-tetrahydropyran-2-ol.

(b) The 6-[4,4-(lower alkylene or arylene dioxy) pentyl]tetrahydropyran-2-ols, as represented by the formula:

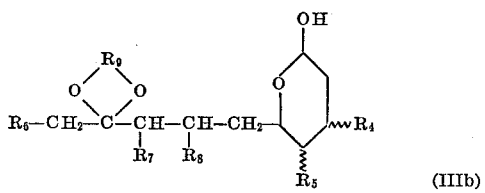

(IIIb)

wherein $R_4$, $R_5$, $R_6$, $R_7$, $R_8$ and $R_9$ are as defined above.

Illustrative examples include

6-[4,4-(ethylenedioxy)pentyl]tetrahydropyran-2-ol,
6-[4,4-(trimethylenedioxy)pentyl]tetrahydropyran-2-ol,
6-[4,4-(propylenedioxy)pentyl]tetrahydropyran-2-ol,
6-[4,4-(ethylenedioxy)hexyl]tetrahydropyran-2-ol,
6-[4,4-(phenylenedioxy)pentyl]tetrahydropyran-2-ol
and the like.

(c) 6-(4-hydroxypentyl)tetrahydropyran - 2 - ol and ethers thereof, as represented by the formula:

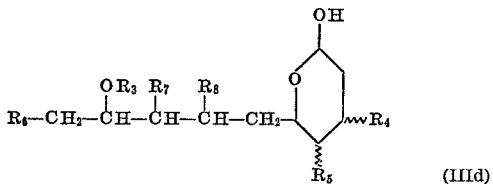

(IIId)

wherein $R_3$, $R_4$, $R_5$, $R_6$, $R_7$, and $R_8$ are as defined above.

Illustrative examples of ethers include 6-(4-methoxypentyl)tetrahydropyran-2-ol,
6-(4-tert.-butoxypentyl)tetrahydropyran-2-ol,
6-[4-(1-methoxyethyl)pentyl]tetrahydropyran-2-ol,
6-[4-(tetrahydropyran-2-yl)pentyl]tetrahydropyran-2-ol,
4-methyl-6-(4-tert.-butoxypentyl)tetrahydropyran-2-ol,
and the like.

The 6-substituted tetrahydropyran-2-ols of Formula I are produced in accordance with this invention by reacting a dialdehyde of the formula

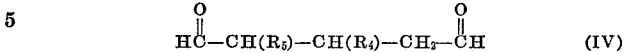

(IV)

with an aliphatic magnesium halide of the formula:

(V)

wherein in Formulas IV and V, R, $R_4$ and $R_5$ are as defined above and X is a halogen, especially chlorine or bromine.

The Grignard reagents employed in the process of this invention are all readily derived from the corresponding alkyl halides or substituted alkyl halides. In particular, the 4-substituted pentyl magnesium halides can be obtained from 1-halo-4-pentanones or 1-halo-4-pentanols. For example, a 1-halo-4-pentanone can be converted to its ketal by reaction with an alkanediol or arylene diol in known manner and the ketal subsequently reacted with magnesium in known manner to produce the starting Grignard reagent. Similarly, a 1-halo-4-pentanone can be converted to its dithia ketal by reaction with dithioethane in known manner, for example, in acetic acid at room temperature and in the presence of boron trifluoride and the dithia ketal subsequently reacted with magnesium in known manner to produce the starting Grignard reagent. Moreover, a monothia ketal can similarly be prepared in a known manner, for example, by reaction of a 1-halo-4-pentanone with 2-mercaptoethanol in dioxane at room temperature in the presence of zinc chloride and sodium sulfate. Also, the monoaza ketals can be prepared in a known manner, for example, by reaction of a 1-halo-4-pentanone with 2-hydroxyethylamine in the presence of acid. Finally, a 1-halo-4-pentanol can be reacted directly with magnesium to produce a hydroxyl-containing Grignard reagent, or first etherified in known manner and the reacted with magnesium to produce an etherified Grignard reagent.

The reaction conditions for the process of this invention are not narrowly critical and in general are those normally employed for Grignard reactions. In general, it has been found, however, that the reaction should be effected at reduced temperatures, i.e., temperatures of less than about 25° C., and preferably in the range of from —30° C. to about +10° C. The reaction may be conducted in any suitable inert organic solvent theretofore employed in Grignard reactions such as ethers, e.g., tetrahydrofuran, and hydrocarbons, and the like.

When in the starting material of Formula IV $R_5$ is lower alkyl, it is advantageous to form a monoketal of the dialdehyde prior to the reaction with the compound of Formula V. By reacting the dialdehyde of Formula IV wherein $R_5$ is lower alkyl with ethylene glycol in benzene and in the presence of a trace of a strong acid catalyst such as p-toluenesulfonic acid, the aldehyde moiety most remote from $R_5$ is preferentially protected. Following the Grignard reaction hydrolysis will then yield the desired tetrahydropyran-2-ol of Formula I wherein $R_5$ is lower alkyl. When utilizing this approach with a Grignard reagent of Formula V which embodies a ketal group which it is desired to preserve in the product of Formula I, said ketal group should be one which is more difficult to hydrolyze than the ethylenedioxy moiety used to preferentially protect the dialdehyde starting material. For this purpose a 2,2-dimethyl-1,3-propylenedioxy moiety is exemplary.

The product 6-substituted tetrahydropyran-2-ol is recovered from the reaction mixture by conventional techniques, such as extraction, fractionation, chromatography, and the like. Although the 6-(4-oxopentyl)tetrahydropyran-2-ol is not obtained directly from this process, it can be readily produced by hydrolysis of the 6-[4,4-(alkylenedioxy)pentyl]tetrahydroypran-2-ols of Formula IIIb.

Similarly, a carbonyl moiety can be regenerated from the dithia ketal group in a known manner, for example, by treatment with phenyl mercuric chloride and calcium carbonate in acetone or by treatment with dioxane in methanolic hydrogen chloride. Also, a carbonyl group can be regenerated from a monothia ketal in a known manner, for example, by treatment under strong acidic conditions, for example, by treatment with aqueous sulfuric acid in dioxane or hydrogen chloride in acetic acid. Moreover, the carbonyl group can be regenerated from a monoaza ketal in a known manner, for example, by treatment with a strong aqueous acid.

The 6-substituted tetrahydropyran-2-ol produced in accordance with the process of this invention is recovered in the form of a racemic mixture. Because the products of this invention are of especial utility as starting materials for the total synthesis of steroids, it is preferred, although not essential, that the racemate be resolved into its optically-active antipodes. This resolution can be carried out by any suitable method. For example, the tetrahydropyran-2-ol can be reacted with a dicarboxylic acid, such as oxalic, malonic, succinic, glutaric, adipic, or phthalic acid, to form a half-ester. The half-ester is then reacted with an optically-active base, such as brucine, ephedrine, or quinine, to produce a diastereomeric salt. The salts, after separation, are then reconverted to the optically-active alcohols. Alternatively, the tetrahydropyran-2-ol can be reacted with an optically-active acid, for example, camphorsulfonic acid. The resulting diastereomeric esters are then separated and reconverted to the optically-active alcohols.

As previously indicated the herein described tetrahydropyran-2-ols of Formula I are compounds which exist in an equilibrium mixture. The structure depicted by Formula I(a) is a cyclic hemiacetal structure, and the main portion of the equilibrium mixture is usually in this form. However, the compounds represented by Formula I can also be represented by a formula depicting their free aldehyde structure. This is illustrated by Formula I(b).

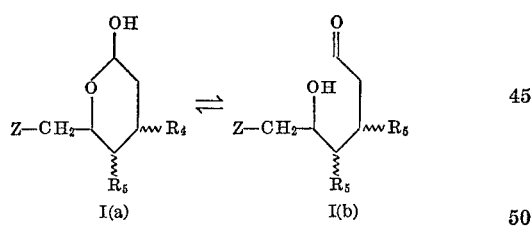

Both of the components of the equilibrium mixture depicted by Formulas I(a) and I(b) above react in the same way, as described below, and are useful for the same purpose. Moreover, the existence of the cyclic hemiacetal of Formula I(a) in the form of the free aldehyde of Formula I(b) can be taken advantage of in the isolation of this compound by forming free adducts of the latter, such as the bisulfite adduct. Such adducts are useful in purifying an equilibrium mixture of compounds of Formulas I(a) and I(b) from the reaction mixture in which they are formed. After separation the adduct can be split, thereby generating the equilibrium mixture of Formulas I(a) and I(b) containing, as indicated above, a major amount of the compound in the form of its cyclic hemiacetal of Formula I(a). Throughout this description, as well as in the examples which follow, the above-discussed equilibrium mixture is to be understood as being represented by the depiction or naming of a tetrahydropyran-2-ol of Formula I(a).

With respect to the absolute stereochemistry, the S-form of the free aldehyde corresponding to the tetrahydropyran-2-ol is preferred as the starting material for the synthesis of steroids.

Illustrative processes by which the tetrahydropyranols are converted to steroids are illustrated by the following schematic flowsheet:

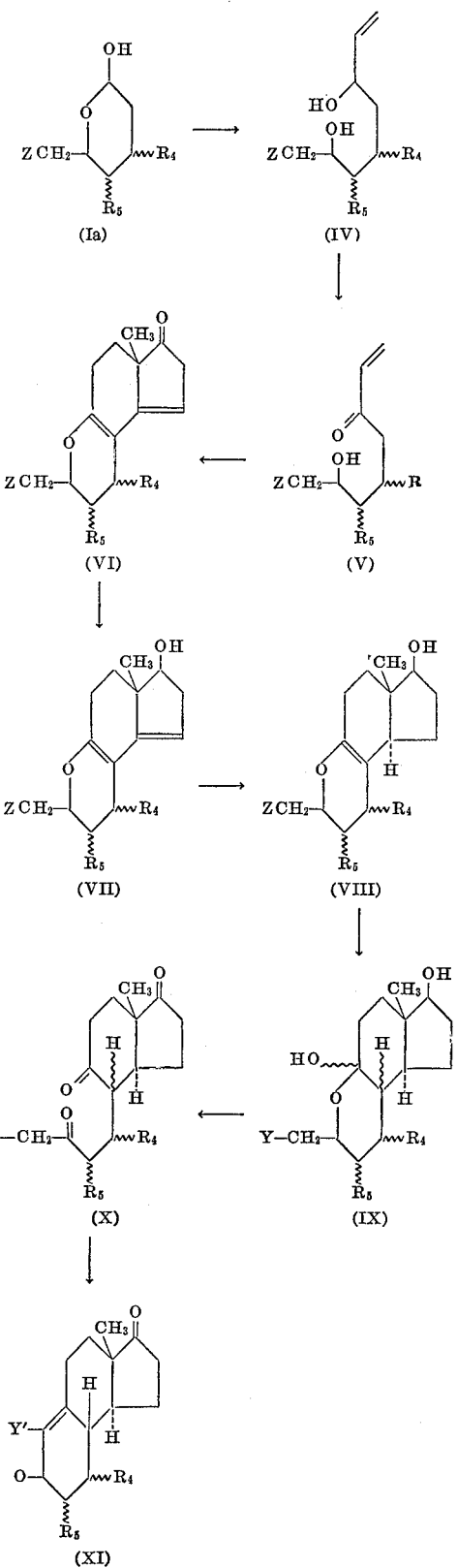

In the first step, a 6-substituted tetrahydropyran-2-ol I(a) is reacted with a vinyl magnesium halide, such as vinyl magnesium chloride, at reduced temperatures, preferably about 0° C., in a suitable solvent, such as tetrahydrofuran, to produce 7-substituted 3,7-dihydroxyheptene (IV). It should be noted that 6-(4-oxopentyl)tetrahydropyran-2-ol should not be employed in this step due to the susceptibility of the 4-oxo group to attack by the vinyl magnesium halide. Thus, this ketone is employed in the form of its ketal (IIIb).

Dihydroxyheptene (IV) is then selectively oxidized to 7-substituted 7-hydroxyhepten-3-one (V) as by reaction with manganese dioxide at room temperature in an inert solvent such as dichloromethane.

Hydroxyketone (V) is next condensed with 2-methylcyclopentane-1,3-dione by refluxing a mixture thereof in toluene, employing a base such as pyridine as a catalyst, to produce a 3 - substituted-6-methyl-2,3,5,6,6a,8-hexahydrocyclopenta[f] [1] benzopyran-7(1H)-one of Formula VI.

After reduction of tricyclic ketone (VI) to the corresponding alcohol (VII), as by treatment with lithium aluminum hydride at 0° C. in tetrahydrofuran, alcohol (VII) is partially hydrogenated to 3-substituted-6-methyl-2,3,5,6,6a,8,9,9a - octahydrocyclopenta[f] [1]benzopyran-7(1H)-ol (VIII). This hydrogenation can be effected catalytically at room temperature and atmospheric pressure over palladium-on-carbon as a catalyst.

Octahydro compound (VIII) is then treated at room temperature with aqueous sulfuric acid, desirably in a water-miscible organic solvent such as acetone, to produce diol (IX). Note, for example, that in this reaction, when Z of compound (VIII) is alkylenedioxybutyl, the alkylenedioxy group is split off to form a keto radical. Thus, Y of diol (IX) differs from Z of compound (VIII) in that during the hydration reaction certain radicals denoted by the symbol Z will undergo change.

Diol (IX) is then oxidized, as by treatment with Jones reagent (chromic acid, sulfuric acid, and acetone) at about room temperature to produce bicyclic ketone (X), wherein Y' differs from Y in that certain radicals denoted by Y will also be oxidized. Thus, this reaction, in addition to effecting the depicted changes, results in the conversion of the 3-hydroxybutyl group, if present, to the 3-oxobutyl group.

Treatment of ketone (X) with p-toluenesulfonic acid in toluene at reflux yields tricyclic compound (XI). Diol (IX) and tricyclic compound (X) are members of known classes of compounds and methods for their conversion into steroidal materials are known in the literature and patents.

The above-described syntheses of steroidal materials from compounds of Formula Ia are described in greater detail in United States patent applications of Gabriel Saucy: Ser. No. 549,816, filed May 13, 1966; Ser. No. 604,124, filed Dec. 23, 1966, and Ser. No. 633,730, filed Apr. 26, 1967, a copy of the descriptive portion and examples of which are made a part of this application by reference.

The following examples are illustrative. All compounds containing a center of asymmetry are racemates unless specifically designated otherwise and all temperatures are in degrees centigrade.

EXAMPLE 1

A solution of ethyl magnesium bromide (produced by the addition of 180 grams of ethyl bromide in 350 milliliters of tetrahydrofuran to 33.3 grams of magnesium in 50 milliliters of tetrahydrofuran) was added gradually to 750 milliliters of a solution of 151 grams of glutaraldehyde in tetrahydrofuran maintained at 10–17° C. After 5 hours at 10–17° C., a solution of 170 grams of ammonium chloride in 1.5 liters of water at −7° C. was added dropwise to the gelatinous slurry. The upper organic layer was separated and the aqueous phase was extracted with three 500-milliter portions of tetrahydrofuran. The solution obtained by combining the supernatant organic layer and the extracts was washed with a mixture of 100 milliliters of saturated ammonium chloride solution and 100 milliliters of saturated sodium bicarbonate solution and then with four 200-milliliter portions of saturated sodium chloride solution. After drying over sodium sulfate and evaporation of the tetrahydrofuran at 35° C. under reduced pressure, three was obtained 143 grams of crude 6-ethyltetrahydropyran-2-ol.

EXAMPLE 2

A solution of 58 grams of glutaraldehyde in 250 milliliters of toluene was added gradually to a solution of ethyl magnesium bromide (prepared from 12.2 grams of magnesium and 65 grams of ethyl bromide in 500 milliliters of tetrahydrofuran) at 0–6° C. After 16 hours at 25° C. and employing recovery techniques similar to those described in Example 1, there is recovered 6-ethyl-tetrahydropyran-2-ol.

EXAMPLE 3

To a solution of 37 grams of glutaraldehyde in 200 milliliters of methylene chloride at 5° C., there was added dropwise a solution of 4,4-(ethylenedioxy)pentylmagnesium chloride [produced from 37 grams of magnesium in 20 milliliters of tetrahydrofuran and 120 grams of 5-chloro-4,4-(ethylenedioxy)-pentane in 600 milliliters of tetrahydrofuran] while maintaining the reaction mixture at 0–6° C. After an additional hour at 0–6° C., the reaction mixture was held at room temperature overnight. The resulting mixture was then treated with about 300 milliliters of an ice-ammonium chloride solution and then extracted with four 500-milliliter portions of chloroform. The organic phase was separated and washed with two 250 milliliter portions of ammonium chloride solution followed by two 200-milliliter portions of water. After drying the chloroform extract over anhydrous sodium sulfate and removal of the solvent, there was obtained crude 6-[4,4 - (ethylenedioxy)pentyl]-tetrahydropyran-2-ol The crude 6 - [4,4 - (ethylenedioxy)pentyl]-tetrahydropyran-2-ol was stirred in a solution of aqueous sodium sulfite (247 g. of anhydrous $Na_2SO_3$ in 1,200 ml. $H_2O$) the pH of which was adjusted to 5–6 by means of acetic and then to pH=7 with sodium hydroxide solution. After one hour at room temperature, the aqueous solution was extracted with a total of 2000 ml. of ether, the pH adjusted to 12 by means of sodium hydroxide, and the aqueous solution extracted again with a total of 4000 ml. of benzene. The benzene extract was washed with water, the organic phase dried over anhydrous $Na_2SO_4$, and the solvent removed in vacuo yielding purified 6-[4,4-(ethylenedioxy)pentyl]tetrahydropyran-2-ol.

The sample of the so-prepared 6-[4,4-(ethylenedioxy) phentyl] - tetrahydropyran-2 ol was recrystallized twice from isopropyl ether-hexane and once from ether-hexane to give material which melted at 47–49°.

Upon treatment of this compound with hydrochloric acid, there is obtained 6-(4-oxopentyl)-tetrahydropyran-2-ol.

EXAMPLE 4

A mixture of α-methylglutaraldehyde (10 g.), benzene (100 ml.), ethylene glycol (5.0 g.) and p-toluenesulfonic acid (300 mg.) was refluxed for 1 hour using a Dean-Stark trap. The benzene phase was washed with saturated $NaHCO_3$ solution and $H_2O$ and then evaporated yielding crude, 5,5-ethylenedioxy-2-methyl-1-pentanal, which was purified by distillation through a Vigreux-column.

To a mixture of magnesium turnings (3.7 g.), tetrahydrofuran (5.0 ml.) and methyl iodide (two crystals) a solution of the chloroketal, 1-chloro-4,4-ethylenedioxypentane (12 g.) in tetrahydrofuran (60 ml.) was added dropwise. After complete addition, the reaction mixture was refluxed for 1 hour. The Grignard solution was decanted from the unreacted magnesium (1.9 g.) and dropped into a solution of 5,5-ethylenedioxy-2-methyl-1-pentanal (5.85 g.) and methylene chloride (20 ml.) at 5° C. After this addition, the reaction mixture was stirred for 1 hour at 5° C. and then at room temperature overnight. The reaction mixture was then treated with ice and ammonium chloride solution and then extracted four times with chloroform. The organic phases were washed with H₂O, dried over sodium sulfate and evaporated under vacuum at 45° C. to give 1,1:9,9-bis(ethylenedioxy)-5-hydroxy-4-methyldecane.

A mixture of 1,1:9,9-bis(ethylenedioxy)-5-hydroxy-4-methyldecane (5.0 g.), acetone (120 ml.) and 1 N sulfuric acid (60 ml.) was allowed to stand for 1 hour at room temperature. The reaction mixture was then extracted three times with ether. The organic phases were washed with saturated NaHCO₃ solution and H₂O then dried over Na₂SO₄ and evaporated under vacuum at 45° C. to give a mixture of 6-[4,4-(ethylenedioxy)pentyl]-5-methyltetrahydropyran-2-ol and 5 - methyl-6-(4-oxopentyl)-tetrahydropyran-2-ol. This mixture can be separated by column chromatography on alumina (neutral; grade III).

EXAMPLE 5

Employing apparatus and procedures similar to those described in Example 3, except that 4-hydroxypentylmagnesium chloride is substituted for the 4,4-ethylenedioxypentylmagnesium chloride, there is obtained 6-(4-hydroxypentyl)tetrahydropyran-2-ol.

EXAMPLE 6

Employing procedures similar to those described in Example 3, except that 4 - tert.-butoxypentylmagnesium chloride is substituted for the 4,4-ethylenedioxypentylmagnesium chloride, there is obtained 6-(4-tert.-butoxypentyl)tetrahydropyran-2-ol.

EXAMPLE 7

Employing procedures similar to those described in Example 3, except that 4-(tetrahydropyran-2-yl)pentylmagnesium chloride is substituted for the 4,4-ethylenedioxypentylmagnesium chloride, there is obtained 6-[4-(tetrahydropyran-2-yl)pentyl]tetrahydropyran-2-ol.

EXAMPLE 8

Employing procedures similar to those described in Example 3, except that 4,4-ethylenedioxyhexylmagnesium chloride is substituted for the 4,4-ethylenedioxypentylmagnesium chloride, there is obtained 6-[4,4-(ethylenedioxy)hexyl]tetrahydropyran-2-ol.

EXAMPLE 9

Employing procedures similar to those described in Example 3, except that 4-tert.-butoxypentylmagnesium chloride is substituted for the 4,4-ethylenedioxypentylmagnesium chloride, and 3-methyl-1,5-pentanediol is substituted for glutaraldehyde, there is obtained 4-methyl-6-(4-tert.-butoxypentyl)tetrahydropyran-2-ol.

EXAMPLE 10

A total of 100 g. of 5-chloro-2-pentanone was treated with 100 g. of catechol in 600 ml. of benzene containing 2 g. of p-toluenesulfonic acid and heated at reflux in conjunction with a Dean-Stark trap, for 24 hours (16 ml. water formed). After cooling to room temperature the dark colored reaction mixture was washed with 1 N aqueous potassium hydroxide solution and dried over neutral alumina (Activity I). Removal of the solvents in vacuo gave a black colored residue (138 g.), which on vacuum distillation furnished pure 4,4-(phenylenedioxy)-1-chloropentane (99.5 g.); B.P. 82° C./0.3 mm. Hg.

A total of 6.3 g. of the above chloroketal in 50 ml. of tetrahydrofuran was converted with 1 g. of magnesium metal to the Grignard reagent (it was found that the Grignard reaction will start at 36° C.). After three hours at 36° C. VPC analysis indicated 96 percent Grignard formation. Redistilled glutaraldehyde (3.1 g.) in 20 ml. of tetrahydrofuran cooled at −45° C. was treated rapidly (~15 minutes) with the above reagent and the reaction mixture was warmed to room temperature over a period of about 25 minutes. The mixture was then stirred a further 1 hour at room temperature, quenched with aqueous ammonium chloride solution (15 percent; 75 ml.) and extracted with ether. Removal of the solvent in vacuo gave 8.4 g. of crude (±)-6-(4,4-phenylenedioxypentyl)-tetrahydropyran-2-ol as a liquid showing one major spot on TLC analysis.

What is claimed is:
1. A compound of the formula

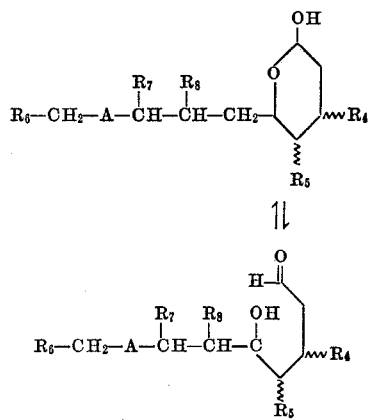

wherein A is carbonyl or —CR₁R₂—; R₁, when taken alone, is OR₃; R₂, when taken alone, is hydrogen; R₁ and R₂, when taken together, are $C_{1-6}$ lower alkylenedioxy, mono or bicyclic arylenedioxy, —OR₉S—, OR₉N— or —SR₉S—, where R₉ is $C_{1-6}$ lower alkylene; R₃ is hydrogen, $C_{1-7}$ lower alkyl, or lower oxyhydrocarbyl selected from the group consisting of $C_{1-10}$ lower alkoxy lower alkyl and tetrahydropyran-2-yl; and each of R₄, R₅, R₆, R₇ and R₈ is independently hydrogen or $C_{1-7}$ lower alkyl.

2. The compound as claimed in claim 1 wherein A is carbonyl.

3. A compound as claimed in claim 1 wherein R₁ and R₂, when taken together, are lower alkylenedioxy.

4. A compound as claimed in claim 3 wherein the two oxygen atoms are joined to the 1 and 2 carbon atoms of the alkylenedioxy group respectively.

5. The compound as claimed in claim 4 wherein said alkylenedioxy group is ethylenedioxy.

6. A compound as claimed in claim 1 wherein R₆, R₇ and R₈ are each hydrogen.

7. A compound as claimed in claim 6 wherein R₄ and R₅ are each hydrogen.

8. A compound as in claim 1 wherein R₁ and R₂ when taken together are arylenedioxy.

9. The compound of claim 8 wherein R₁ and R₂ when taken toegther are phenylenedioxy.

10. The compound as claimed in claim 7 wherein A is —CR₁R₂— and R₁ and R₂ are alkylenedioxy.

11. A compound as claimed in claim 1 wherein R₁ is OR₃ and R₂ is hydrogen.

12. The compound as claimed in claim 11 wherein R₃ is hydrogen.

13. A compound as claimed in claim 11 wherein R₃ is lower alkyl.

14. The compound as claimed in claim 13 wherein R₃ is tert.-butyl.

15. A compound as claimed in claim 11 wherein R₃ is lower oxyhydrocarbyl.

16. The compound as claimed in claim 15 wherein R₃ is tetrahydropyranyl.

17. In a process for producing a 6-substituted tetrahydropyran-2-ol of the formula

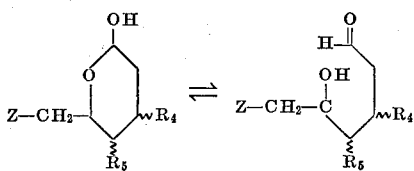

wherein Z is oxobutyl or R; R is hydrogen, $C_{1-7}$ lower alkyl, or a 3-substituted radical of the formula $$R_6CH_2C(R_1,R_2)CH(R_7)CH(R_8)—$$

$R_1$, when taken alone, is $OR_3$; $R_2$, when taken alone is hydrogen; $R_1$ and $R_2$, when taken together, are $C_{1-6}$ lower alkylenedioxy, mono or bicyclic arylenedioxy, $—OR_9S$, $—OR_9N$ or $—SR_9S$, where $R_9$ is $C_{1-6}$ lower alkylene; and each of $R_4$, $R_5$, $R_6$, $R_7$ and $R_8$ is independently hydrogen or $C_{1-7}$ lower alkyl; the step of reacting a dialdehyde of the formula:

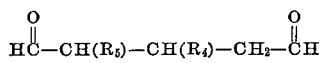

wherein $R_4$ and $R_5$ are as defined above with a Grignard reagent of the formula:

wherein R is as defined above and X is halogen.

18. The process as claimed in claim 17 wehrein $R_4$ and $R_5$ are each hydrogen.

19. The process as claimed in claim 18 conducted at a temperature in a range of from $-30°$ C. to $+10°$ C.

20. In a process for producing a product as claimed in claim 1, the step of reacting glutaraldehyde with a Grignard reagent of the formula:

wherein $R_1$, $R_2$, $R_6$, $R_7$ and $R_8$ are as defined in claim 1 and X is halogen.

21. The process as claimed in claim 20 conducted at a temperature in a range of from $-30°$ to $+10°$ C.

22. The process as claimed in claim 20 wherein glutaraldehyde is reacted with 4,4-ethylenedioxypentyl magnesium halide.

23. The process claimed in claim 20 wherein glutaraldehyde is reacted with 4,4-phenylenedioxypentyl magnesium halide.

24. The process claimed in claim 20 wherein gluteraldehyde is reacted with 4-tertiarybutoxypentyl magnesium halide.

References Cited

Colonge et al., "Conpt. Rend.," vol. 245, 1957, pp. 974–976 (Q-46-A14).

Houben-Weyl, "Methoden Der Organischen Chemie," Band VI, April 1966, pp. 338–346.

Morrison et al., Organic Chemistry, 2nd ed., 1966, Allyl and Bacon, Inc., Boston, pp. 517–21.

Woolford, "Journal of Organic Chemistry," vol. 23, 1958, pp. 2042–3.

ALEX MAZEL, Primary Examiner

J. H. TURNIPSEED, Assistant Examiner

U.S. Cl. X.R.

260—247.7, 294, 327, 338, 340.9, 340.7, 545.7, 345.9, 586, 594, 602